Sept. 21, 1965  H. HÜGEL  3,207,223
SAMPLE TAKER OF LIQUIDS UNDER PRESSURE FOR FORMATION TESTING DEVICES
Filed April 23, 1963  4 Sheets-Sheet 1

INVENTOR.
HELMUT HÜGEL
BY
ATTORNEY.

INVENTOR.
HELMUT HÜGEL

ATTORNEY.

United States Patent Office 3,207,223
Patented Sept. 21, 1965

3,207,223
SAMPLE TAKER OF LIQUIDS UNDER PRESSURE
FOR FORMATION TESTING DEVICES
Helmut Hügel, Rua Belo Horizonte 37,
Salvador, Bahia, Brazil
Filed Apr. 23, 1963, Ser. No. 275,131
14 Claims. (Cl. 166—163)

The present invention relates to a sample taker for liquids under pressure for formation testing devices.

The investigation of layers found in deep drillings, which layers contain possibly oil and/or gases, by means of formation testing devices, is a known important auxiliary means, in order to ascertain the output capacity of such layers already in the un-cased bore-hole. Such formation testing devices are mounted in the bore-hole with empty or nearly empty drill pipes and a packer utilized to close up the annular space, above the layer to be investigated, between the drill pipe and the bore-hole wall, prior to the opening of a valve in the testing device. This procedure is described, for example, in part 8a of the article "Formation Testing Fundamentals", by Cecil R. Richardson, in the Petroleum Engineer of August 1960, and in U.S. Patent No. 2,073,107. The liquid disposed in the layer pores under pressure (oil with gas in solution or gases or water) flows into the empty drill pipe through the said valve. A pressure recorder is usually disposed below the valve of the testing device, which pressure recorder registers the pressure during the flow test and closes the main valve of the testing device in response to layer pressure build-up, as disclosed, for example, in U.S. Patent 2,719,588. Finally, the packer is released and the formation testing device is removed from the bore hole with its valve closed and the liquid mixture disposed on top thereof in the drill pipe. Oil contains mostly larger or smaller quantities of gases in solution. This gas is liberated from the oil upon the release of the pressure as the liquid filled drill pipe stands are broken, joint by joint, and the liquid contents thereof spill onto the derrick floor. Part of the pressure on the liquid column inside of the string jet in the bore hole is thus released to cause periodic, free flow of oil and gas onto the derrick. This condition, of course, is objectionable and highly dangerous, and means have been proposed, as for example those disclosed in U.S. Patent 2,337,752, to circulate the test sample out of the drill pipe through a circulation valve, to alleviate this condition.

It is still necessary to rely on estimates in the performance of a conventional formation test under the above stated conditions concerning the gas-oil relationship of the liquid present in the layer to be investigated, as well as the important physical characteristics of the oil with the gases in solution at the pressure and temperature prevailing at the layer, which estimates can vary within large limits. Accurate laboratory investigations of these values can be performed only after the bore produces from the particular layer. It frequently happens that several oil bearing layers are passed in a bore hole with one drilling, from which at first one only is taken into normal production. In such cases, the characteristics of the liquids of the other layers, as for example, the gas/oil solution ratio, the viscosity of the liquid under layer conditions, the surface tension between the oil and the gases, the compressibility of the liquid, and the shrinkage of the oil upon gas release and temperature reduction, the knowledge of which is of importance for a rational exploitation, are unknown until the particular layer is finally taken into production.

The desirability of obtaining layer liquid samples under original condition at the formation at the time the formation test is made, has been recognized, and apparatus developed therefor, as for example, the liquid recovery receptacle disclosed in U.S. Patent No. 2,719,588. Such apparatus have not proven particularly satisfactory, however, in that various inaccuracies due to changes in the natural ratio of gas to oil in the liquid sample, contamination of the liquid sample with air, and gas-oil separation within the receptacle, are inherent in the operation thereof.

It is, therefore, the primary object of the present invention to provide an improved sample taker for liquids under pressure, for use in conjunction with conventional formation testing devices, which operates to eliminate the inaccuracies inherent in the operation of the sample taker apparatus of the prior art.

It is another object of the present invention to provide a sample taker for liquids under pressure, which comprises a high pressure resistant container of comparable diameter to the drill pipe. The sample taker is built into the test string of a conventional formation testing device, as for example that described in the article "Formation Testing Fundamentals" referred to hereinabove, and is located therein below the tester valve, the by-pass valve, and the closed in pressure valve and reversing parts of the conventional formation testing string. The sample taker of the present invention can also be used in conjunction with formation testing devices of the nature discloesd, for example, in U.S. Patent 2,719,588, being located in this instance just below the control assembly and above the tester valve and equalizer to thus replace the receptacle unit. The sample taker of the present invention has a sample chamber extending therethrough, and a valve located at each end of the sample chamber for closing the latter to contain the liquid sample therein. The valves are opened when the sample taker is lowered into the bore hole. When the tester valve of the formation testing device is opened, the liquid sample emerging from the layer to be tested, flows through the sample chamber into the drill pipe. Drilling mud which is originally present in the sample chamber is eliminated therefrom by means of a siphon pipe arrangement in the sample taker, and gas which may separate from the liquid sample can escape upwardly through a small hole in the head of one of the siphon pipes. Toward the end of the flow test, the normal openings in the mandrel of the closed-in pressure valve of the formation testing device, are closed, leaving only a very small flow bean for continued flow of the sample liquid into the upper part of the test string. By this arrangement, the pressure at the bottom of the bore hole in the portion of the test string below the very small flow bean gradually builds up close to the original layer pressure. At the same time, the gas liberated from the oil in the liquid sample during the normal flow period, and also the partially de-gasified oil, are eliminated from the sample chamber through the small flow bean, and fresh sample liquid, with the natural content of gas in solution therein, is flowing from the formation tested into the sample chamber. The closed-in pressure valve is then completely closed to cause the pressure at the bottom of the bore hole to build up to static formation pressure. At this point, both of the sample chamber valves are automatically closed, either by a slight lifting of the drill pipe to open the by-pass valve, or by rotation of the drill pipe in order to retract the mandrel of the closed-in pressure valve to the position thereof in which the side ports of the formation testing device are open. If a slight lifting of the drill pipe is used to close the sample chamber valves, the sample chamber valve closing takes place prior to the opening of the by-pass valve, to permit access of the drilling mud in the annular bore hole space above the packer and equalize the hydrostatic pressures above and below the packer. This greatly facilitates the unseating of the packer, as described in the publication referred to hereinabove. The sample chamber valves are constructed to hermetically seal the liquid sample contents of the sample chamber therewithin. Simultaneously with the closing of the sample chamber valves, a circulation path is opened through the sample taker to make possible pressure equalization therewithin. This circulation path extends through the by-pass valve and packer to the portion of the bore hole below the packer. In cases wherein the sample taker is located in the drill pipe below the closed-in pressure and circulation valve of the formation testing equipment, and rotation of the drill pipe is used to close the sample chamber valves, the relative vertical motion of the mandrel of the closed-in pressure and circulation valve is used to automatically close the sample chamber valves. In this instance, no flow through the circulation path in the sample taker is required, since the tester and by-pass valves are located below the sample taker. Further, no external, hydrostatic mud pressure acts on the sample chamber valves since the latter are enclosed in the tester string section between the closed-in pressure valve and the now closed tester valve. Thus, no pressure differential acts on the sample chamber valves until the formation testing device is pulled to the surface, or until a relief valve—as disclosed, for example, in the article "Formation Testing Fundamentals" referred to hereinabove—provided in the tester string section between the closed-in pressure valve and the tester valve, releases the pressure from the tester string section, or leakage in the tester string joints or in the tester valves reduces the pressure acting on the exterior of the sample chamber valves.

The liquid disposed in the sample taker can be pumped under pressure into conveyance containers or in the laboratory directly from the sample taker into a high pressure autoclave after its removal from the bore hole. Prior thereto, it is necessary, however, to homogenize the content of the sample taker by a temperature rise to the layer temperature and, thereby, by pressure increase to the layer pressure and by intermixing by means of shaking, so that the characteristics of the liquid contained therein correspond with those present at the layer, which are investigated thereafter in a high pressure autoclave.

With these and other objects in view, which will become apparent in the following detailed description, the present invention will be clearly understood in connection with the accompanying drawings, in which.

Referring now to the drawings, the sample taker of the present invention, which is adapted for use in conjunction with conventional formation testing devices in the recovery of liquids under pressure from subterranean formations, comprises an outer tube 1. Generally similar valve chambers 2 and 2' are fixedly secured as shown at opposite extremities of the outer tube 1. The valve chambers 2 and 2' include extension collars 3 and 3' welded thereto with internal threads being formed as shown on the extension collars 3 and 3' to make it possible to conveniently attach the sample taker into the formation tester string. This attachment may be made below by the closed-in pressure and circulating valve and the tester valve and by-pass valve, and above the packer, or alternatively, immediately below the closed-in pressure and circulating valve and above the tester valve and by-pass valve and packer. The elements of conventional formation testing equipment referred to above, such as the closed-in pressure and circulating valve, the tester valve, the equalizing or by-pass valve, and the packer, do not per se form a part of the subject matter of the present invention, but do constitute elements in the entire structural combination and, of course, function in cooperation with the sample taker of the present invention. Reference is made in the following description to prior publications relating to the elements of conventional formation testing equipment—which appear in FIGS. 1 and 11 of the drawings—only to facilitate the understanding of the operation of the sample taker of the present invention, and to make clear the nature of slight alterations which may be made in the structures of the elements for these purposes.

Figure 1:
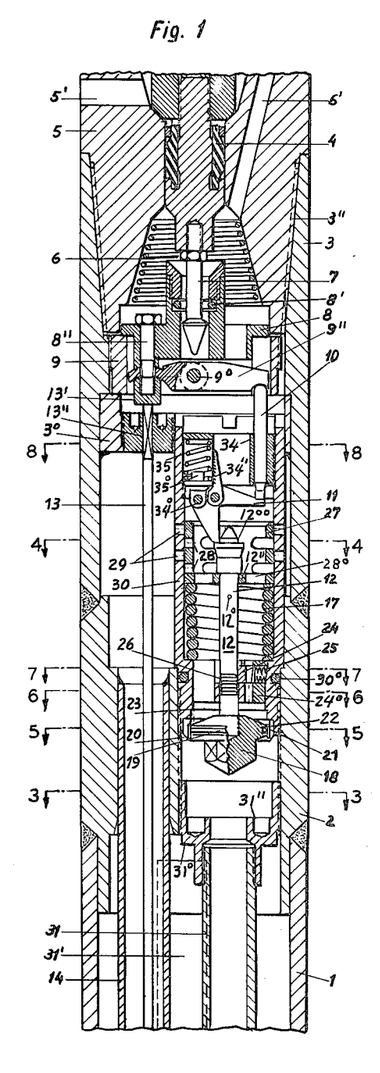
FIGURE 1 is an axial section of the upper portion of the sample taker for liquids under pressure designed in accordance with the present invention, and includes on the upper end of the sample taker the lowermost portion of the by-pass valve of conventional formation testing equipment.
Figure 2:
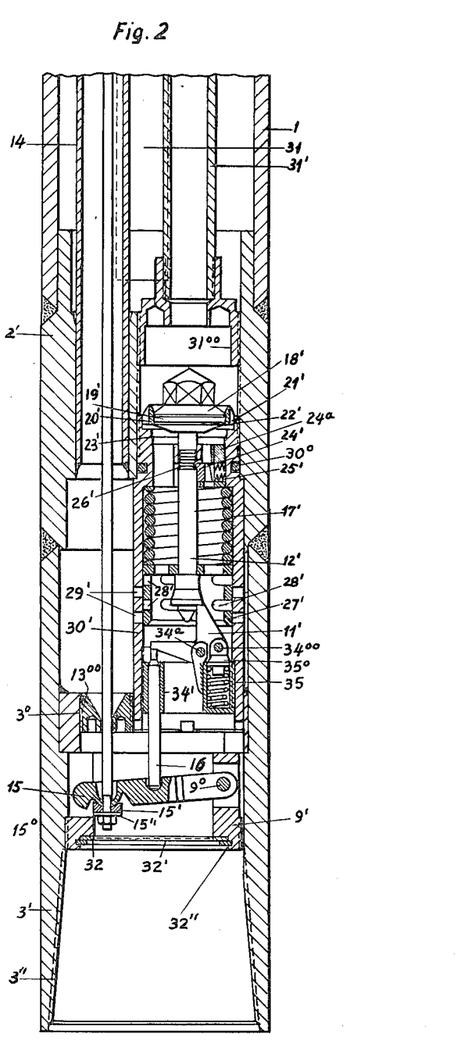
FIG. 2 is an axial section of the lower portion of the sample taker shown in FIG. 1.
Figure 9:
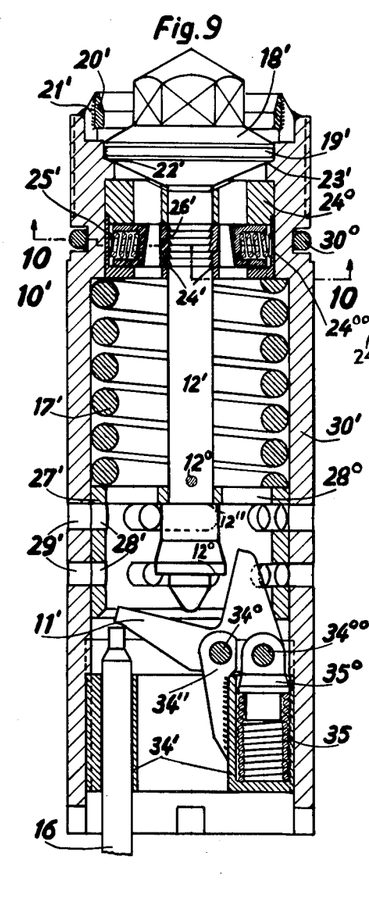
FIG. 9 is an enlarged axial section of the lower valve of the sample taker and depicts the valve in the closed position thereof in conjunction with a slightly different arrangement of catching dogs from those depicted in FIGS. 1–6 and 7.

The valve chambers 2 and 2' include substantially identical valve units, which are depicted in the open positions thereof in FIGS. 1 and 2, and in the closed position thereof, for one of the units, on an enlarged scale in FIG. 9. Support sleeves 9 and 9' are threadedly connected, as shown, to the extension collars 3 and 3', and function to support the valve closing mechanism outside of the valve units in a manner described in detail hereinbelow. Guide sleeves 3⁰ are welded at opposite ends of the sample taker to the inside of the extension collars 3 and 3' and function as guides for the outer end of the valve assemblies. In addition, the guide sleeves 3⁰ support guide glands 13″ and 13⁰⁰ for guiding the operation of the valve pull rod 13.

The valve closing mechanism for both of the valves is operated by a vertical movement of a releasing rod 7 (FIG. 1) or 7' (FIG. 11) relative to the support sleeves 9 and 9'. The relative vertical movement of the releasing rods 7 and 7', respectively, is effective in different manners, to close the valve, depending upon the position of the sample taker within the formation tester string.

The connection of the upper end of the sample taker to the by-pass valve of conventional formation testing devices is depicted in the upper portion of FIG. 1. By-pass valves of this nature function to provide access, after the performance of the formation test, for the drilling mud into the annular space between the drill pipe and the bore hole wall disposed below the packer to thus relieve the hydrostatic drilling mud pressure on the packer and facilitate the unseating of the packer and the pulling of the testing string out of the bore hole at the completion of the formation testing operation. In order to open a by-pass valve of this nature at the end of the formation testing operation, the drill pipe in the upper portion of the tester string to which the piston 4 (FIG. 1) of the by-pass valve is connected, is slightly raised from the derrick at the surface in any convenient manner, whereby the resultant relative vertical movement between the piston 4 and the chamber 5 of the by-pass valve functions to connect the annular space between the bore hole outside of the tester string to a bore 5' with an inner chamber 6, formed as shown below the piston 4. The chamber 6 is, prior to this relative vertical movement, in communication with the portion of the formation tester string above the by-pass valve through a channel 6'. At the commencement of the vertical movement of the piston 4 relative to the valve chamber 5, and before the bore 5' is open to communication with the inner chamber 6, the releasing rod 7 which is secured to the lower end of the piston 4, as shown, engages split spring-clip rings 8' of a coupling member 8, to thus lift the coupling member 8 and compress a safety spring $8^0$. This in turn results in a corresponding lifting of screw 8'' which is connected as shown at its lower extremity to a pull rod 13 by a nut 13'. The top of nut 13' is articulated with a lower projection of the coupling member 8, and the left arm of a double-armed lever 9'', the latter being in turn pivotably supported by a bolt $9^0$ extending therethrough from sleeve 9. Thus, when the left arm of the double-armed lever 9'' is lifted, through the connection thereof to screw 8'', as described above, the left side of the double-armed lever 9'' pushes downwardly on a trigger pin or tappet 10, the lower end of which engages the horizontal lever arm of a second double-armed lever or bell crank 11. The bell crank 11 is pivotably disposed in the internal valve closing assembly of the valve unit, as described hereinbelow.

The pull rod 13 passes through the guide gland 13'', a by-pass tube 14 and the guide gland $13^{00}$, respectively, to the lower end of the sample taker. The lower end of the pull rod 13 is connected by means of a bearing 15', washer 15'' and nut $15^0$ to the left side of the lower releasing lever 15, which is in turn pivotably connected by means of a pin $9^0$ to the sleeve 9'. The releasing lever 15 is provided, at a location which coincides with the center line of the sample taker, with a bearing for the lower end of a trigger pin or tappet 16, and functions as the release mechanism for the lower valve unit as described hereinbelow.

Figures 11, 12, 13, 14, 15:
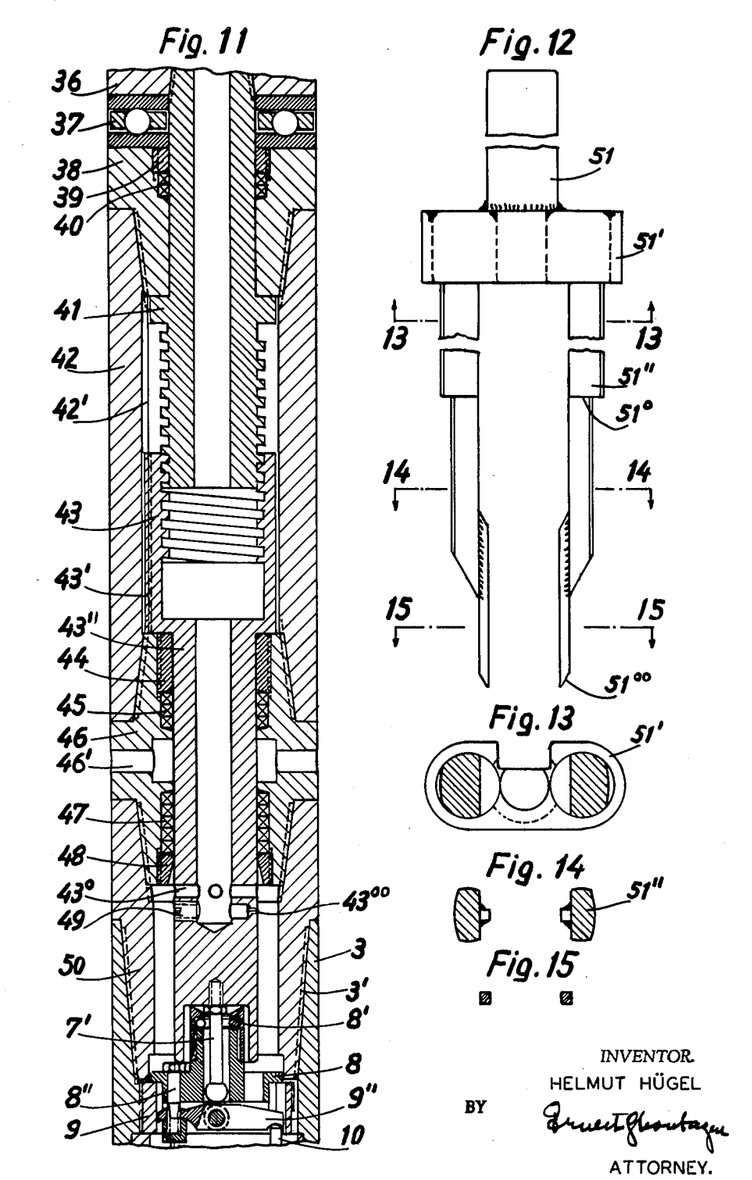
FIG. 11 is an axial sectional view of the other end of the sample taker depicted in conjunction with a rotary control assembly, with closed-in pressure and reversed circulation valve of the nature shown in U.S. Patent No. 2,719,588.
FIG. 12 is a side elevation of the arming fork for the sample taker valves.
FIG. 13 is a section along the lines 13—13 of FIG. 12.
FIG. 14 is a section along the lines 14—14 of FIG. 12.
FIG. 15 is a section along the lines 15—15 of FIG. 12.

Alternatively, as seen in FIG. 11, the upper part of the sample taker is connected to the closed-in pressure and circulation valve assembly of a conventional formation testing device of the nature described, for example, in U.S. Patent 2,719,588. In this instance, slight modifications are made in the closed-in pressure and circulation valve assembly to improve the operation of the valve closing mechanism, as described below. In this instance, the sample taker of the present invention replaces the receptacle unit disclosed in U.S. Patent 2,719,588, and the tester and equalizing valve assembly and the packer are connected to the lower end of the said sample taker. In this instance, the relative vertical movement of the releasing rod 7', required to close the sample taker valve, is obtained by rotation of the drill pipe from the surface in any convenient manner at the end of the formation testing period. As seen in FIG. 11, a sub 36, connected at its upper extremity to the drill pipe, carries a jack mandrel 41 at its lower extremity with a heavy duty thrust bearing 37 being positioned as shown immediately beneath the sub 36. The thrust bearing 37 abuts the top of a packing box 38, within which is retained packing material 40 by a packing gland 39. The mandrel 41 has a central bore and is provided at its lower extremity with external threads which engage the internal threads of a cross-head 43. The cross-head is slidably mounted within a housing 44 and includes a key 43' projecting therefrom into a key-way 42' formed on the inside of the housing 42. The housing 42 is threadedly secured as shown to the lower extremity of the said sub 36.

The cross-head 43 has on its lower extremity a reduced lower mandrel portion 43'' which is provided with a central bore and is surrounded by an upper packing 45. A packing gland 44 is positioned as shown in the upper portion of a sub 46, and the latter is threadedly connected, as shown, to the housing 42. A lower packing 47 and packing gland 48 are also provided on the sub 46. Ports 46' extend transversely through the sub 46 intermediate the packings 45 and 47, respectively, into communication with the bore hole 3. The reduced mandrel portion 43'' is provided with transverse holes $43^0$ which extend from the central bore of the mandrel portion 43'' to an annular space formed between a connection sub 50 and the lowermost, un-bored portion of the mandrel portion 43'' when the cross-head 43 is in its lowermost position relative to the housing 42, the sub 46, and the connection sub 50. This occurs when the formation testing assembly is run into the bore hole. A very small hole or flow beam $43^{00}$ is provided in the mandrel portion 43'' a small distance below the transverse holes $43^0$, with one end of the flow beam $43^{00}$ being plugged as shown with a screw 49. A releasing rod 7', which includes a ball-shaped, enlarged lower end, is threadedly secured, as shown, to the lower end of the mandrel portion 43''. A generally cylindrical, hollow extension is also carried at the lower end of the mandrel portion 43'' and functions to hold the coupling 8 and screw 8'' in the lower position thereof relative to the valve releasing mechanism during the running of the sample taker and the formation testing equipment into the bore hole.

Figure 3:
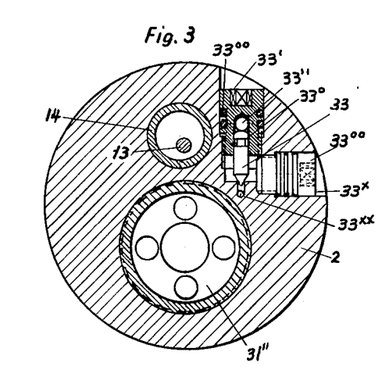
FIG. 3 is a section along the lines 3—3 of FIG. 1.
Figure 4:
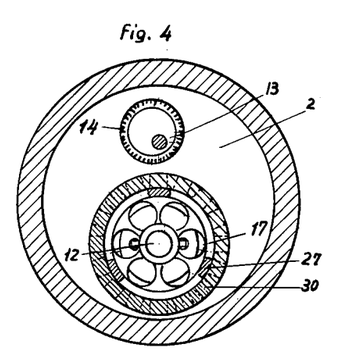
FIG. 4 is a section along the lines 4—4 of FIG. 1.

If the sample taker is built into the formation testing string below the closed-in pressure and circulating tool, as described, for example, in the article "Formation Testing Fundamentals" referred to hereinabove, a releasing rod similar to the releasing rod 7' of FIG. 11, is connected to the sliding valves of the tool. The releasing rod would in this case pass through a suitable packing provided for this purpose on the lower end of the chamber which encloses the sliding valve, with the ball-shaped enlarged end of the releasing rod being located a similar distance below the split, spring-clip ring 8' of the coupling member 8, as shown in FIG. 11. The spring loaded relief valve disclosed in this article is in this case eliminated and may either be replaced by an identically constructed release valve located in a sub below the sample taker, or a valve arrangement of a nature similar to that depicted in FIG. 3 with a valve 33 and valve plug located in a sub below the sample taker. In this case, the liquid and gas confined inside the tester string portion between the tester valve and the closed-in pressure valve, which is brought to the surface under pressure, may be measured as soon as the tester string portion reaches the surface. This method of connecting the sample taker with its upper end directly to the lower end of the closed-in pressure and circulating tube, is not shown in the drawings. Functionally, the flushing and filling method of the sample taker, and the operation of the valve releasing mechanism, would in this case be identical with those described in detail in conjunction with FIG. 11, with the adaptation of the tool described in the article presenting no particular problem.

Figure 5:
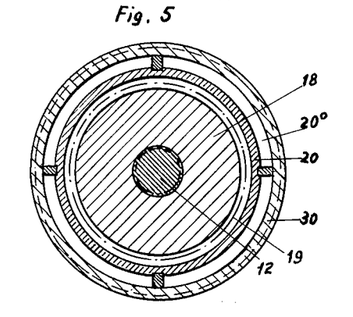
FIG. 5 is a section along the lines 5—5 of FIG. 1.
Figure 6:
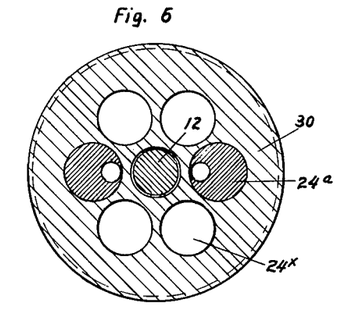
FIG. 6 is a section along the lines 6—6 of FIG. 1.
Figure 7:
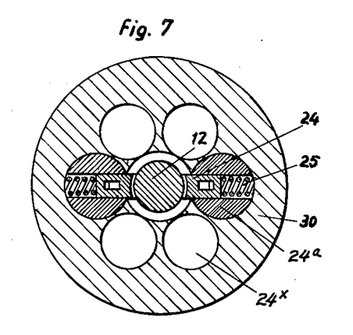
FIG. 7 is a section along the lines 7—7 of FIG. 1.
Figure 8:
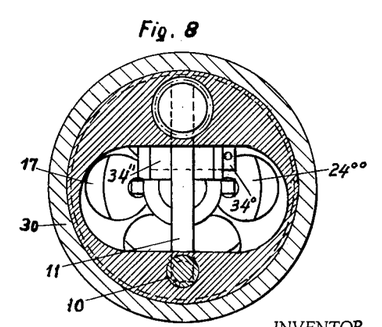
FIG. 8 is a section along the lines 8—8 of FIG. 1.
Figure 10:
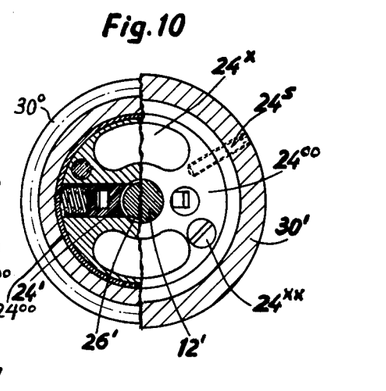
FIG. 10 is a section taken along line 10—10 of FIG. 9.

The sample taker valve assemblies of FIGS. 1 and 2, as shown in greater detail in FIGS. 9 and 10, are of substantially identical construction at each end of the sample taker. The valve assemblies are inserted into the sample taker through an opening in guide sleeve $3^0$ and threadedly connected into the valve chambers 2 and 2'. An O-ring $30^0$ is provided in each of the valve assemblies to provide a pressure-tight seal between the respective parts thereof. As shown in closed position in FIG. 9, the lower of the valve assemblies comprises an outer valve casing 30' which is provided on the inner end thereof with a protection sleeve 20' supported by rings 21' to leave passageways 20⁰ (FIG. 5) for the fluid passing through the valve when in the open position thereof. A valve stem 12' is threadedly connected to the valve body 18', with the valve stem 12' having at the opposite end thereof an enlarged head portion of the form shown in the drawings. A valve packing is provided and comprises an O-ring 19' which is completely covered during the assembly period and during the flow of liquid through the sample taker, by means of a protection sleeve 25, so that the valve packing cannot be damaged by the flow of liquid, such as drilling mud, oil, gas or water through the passageways 20⁰ provided therefor. The O-ring 19' functions to seal the valve in its closed position within a generally cylindrically formed recess provided at the inner end of the valve case. The O-ring 19' also seals the valve body 18' at the inner edge 22' thereof relative to the valve seat 23' with which the valve body 18' makes contact when the valve is in the closed position thereof. The portion of the valve stem 12' just adjacent the valve body is guided by a guide sleeve 24⁰ which is provided with fluid passage ways 24ˣ extending therethrough in the manner made clear by FIG. 10. Catching dogs 24' are slidably disposed in correspondingly shaped, radially extending slots provided in the sleeve 24⁰, and are urged against the valve stem 12' by coil springs 25'. The latter are in turn supported by a cap sleeve 24⁰⁰, which is secured to the sleeve 24⁰ by means of screws 24ˣˣ. The entire catching dog assembly is maintained in a fixed position by means of screws 24ˢ. As shown in FIG. 9, the teeth of the catching dogs 24' are shown in the engaged position thereof with the corresponding grooves 26' formed in the valve stem 12', to thus maintain the valve body in the closed position thereof in the case of exterior pressure acting on the valve body 18'.

As will be noted, the catching dog assembly depicted in FIGS. 1, 2, 6 and 7 is slightly different from that depicted in FIGS. 9 and 10. The catching dog 24' and coil springs 25 and 25' as depicted in the former figures, are slidably disposed transversely of the sample taker valve assemblies in tapered plugs 24ᵃ inserted into correspondingly tapered holes in the valve cases 30 and 30', respectively, in the manner made clear by FIGS. 6 and 7. The catching dog bearing arrangement of FIGS. 9 and 10 facilitates the fabrication thereof; there being, however, no functional differences between the two arrangements. The catching dogs 24' cannot of course fixedly engage the smooth portion of the valve stem 12', whereby it may be readily understood that sliding movements of the said valve stem 12' relative to the said catching dogs 24' may readily occur, so long as the valve stem 12' is not in the closed position thereof, as depicted in FIG. 9. Locking the valve bodies 18' in the closed position thereof, is of particular importance in cases, wherein the sample taker of the present invention is built into a formataion testing string below the by-pass or equalization valve. In this case, upon termination of the formation testing operation and closing of the sample taker valve, the hydraulic fluid pressure of the drilling mud in the bore hole has access, through the opening of the pistons in the equalizing valve, to the lower part of the tester string in which the sample taker is disposed. This hydraulic fluid pressure is always higher than the formation pressure, which now substantially prevails within the sample taker, since the bore hole would blow out otherwise. Thus, upon the closing of the valve bodies 18' and 18 of the sample taker valve assemblies, and the opening of the piston of the by-pass or equalizing valve, high-pressure drilling mud would penetrate into the sample taker due to the lower formation pressure prevailing therein unless the valve bodies 18 and 18' are securely maintained in a closed position thereof against the action of this higher pressure.

Penetration of the drilling mud into the sample taker would possibly damage O-rings 19 and 19', whereby the O-rings would soon lose the important sealing thereof.

As seen in FIG. 9, the valve 18' is urged into the closed position thereof by means of a coil spring 17', which engages, on one side, with an abutment in the valve case 30' and the cap sleeve 24⁰⁰, and on the other side, with piston sleeve 27', the bottom wall of which (perforated with holes 28⁰) engages an abutment 12'' of the head of the valve stem 12'. It will be readily understood that the slots 28', provided in the piston sleeve 27', register with holes 29' in the side wall of the valve case 30' when the valve 18' is in its closed position, and that the slots 28' and holes 29', respectively, are not in registry when the said valve body 18' is in the open position thereof, as shown in FIGS. 1 and 2.

A trigger mechanism for operating the valve assembly is disposed as a unit inside of the lower portion of the valve case 35, and supported therein from a perforated plug member 34', which is threadedly supported, as shown at the lower portion of the valve case 30'. A second double-armed lever or bell crank 11' is pivotably supported from the plug member 34' by means of a bearing 34'' and a pin 34⁰ extending therethrough. To the right of the pin 34⁰, as seen in FIG. 9, the bell crank 11' carries a plug 35⁰, which is attached thereto by means of a pivot pin 34⁰⁰ extending therebetween. The plug 35⁰ is positioned as shown within a portion of perforated plug member 34', and is urged upwardly relative thereto by a coil spring 35 bearing thereagainst. Thus, the arm of the bell crank 11' which extends to the left of the pivot pin 34⁰ as seen in FIG. 9, is urged downwardly by the action of the coil spring 35, and the generally vertical arm of the bell crank 11' is urged towards the center of the valve stem 12' into engagement with an abutment 12⁰⁰ provided on the valve stem head. This abutment functions to keep the valve stem 12' in the upper position thereof when the coil spring 17' is compressed and the valve body 18' in the open position thereof, as depicted in FIGS. 1 and 2. A trigger pin or tappet 16 is slidably positioned within an axial bore in the plug member 34', with the upper end of the tappet being in contact with the left arm of the bell crank 11' and the lower end of the pin being in engagement with a releasing lever 15 for the lower sample taker valve unit in the manner made clear by FIG. 2. The lower end of tappet 10, which is slidably positioned in an axial bore in the plug member 34 of the upper valve assembly, as seen in FIG. 1, is in engagement with the right arm of bell crank 11, and a bearing on the right end of double-armed lever 9'', respectively, in the manner made clear in FIG. 1.

The valve assemblies of the sample taker must be set in the open positions thereof before the sample taker is connected to the elements of a formulation tester string, with which it is run into the bore hole. To this effect is provided the arming fork depicted in FIGS. 12–15. The arming fork comprises an upper push rod 51 and an oval fork base 51' to which two fork prongs 51'' are welded. The prongs 51'' each have abuttments 51⁰ and carry rods of square cross-section as shown in FIG. 15, at the lower ends thereof, with the lower ends of the rod having oblique surfaces 51⁰⁰. When individually arming, or opening, the valve assemblies, as for example the lower valve assembly of FIG. 9, the arming fork is introduced through an oval hole in the plug member 34' with the fork prongs 51'' protruding through the hole in the bottom wall of the piston sleeves 27' and fitting into the holes 28⁰ in sleeve 27'. The oblique surfaces 51⁰⁰ of the prong ends engage the similarly oblique surfaces of the fork receiving holes provided in the catching dog 24', and extend therethrough into the holes in cap sleeve 24⁰, to shift the catching dogs 24' against the pressures of the coil springs 25' radially outward to disengage the catching dog teeth from the grooves 26' in the valve stem 12'. After the fork has penetrated the valve assembly to an extent sufficient to move the catching dogs 24' out of the engagement with the valve stem grooves 26', the abutments 51⁰ provided on the fork prongs engage the bottom wall of the piston sleeve 27' to compress the coil springs 17' and move the valve body 18' to the respective open positions thereof. The vertical arm of the bell crank 11' then notches into the abutment on the head of the valve stem, being urged into this engagement by coil spring 35, whereby the valve body 18 is thus maintained in the open position thereof upon removal of the arming fork. The opening of the upper valve assembly is carried out in an identical manner.

When the valve assemblies are closed, the slots 28 and 28' in the annular pistons 27 and 27' are positioned opposite the bores 29 and 29' of the valve cases 30 and 30'. By this arrangement, a circulation path through the bores 29 and 29', the slots 28 and 28', the inner space of the valve chambers 2 and 2', and a by-pass tubing 14, is opened, so that fluid flow can take place through the sample taker without interfering with the contents of the sample chamber. In the event that the sample taker valves are closed prematurely by an unintentional vertical movement of the piston 4 of the by-pass valve, the formation test is not affected thereby, with the exception that no test fluid sampling can be accomplished with the sample taker, since the liquid flowing into the drill pipe from the bore hole would now flow through the by-pass tube 14.

The outer tube 1 which defines the sample taker, comprises two siphon pipes 31 and 31', which are threadedly inserted intermediate the siphon heads 31" and 31⁰⁰ into the openings above and below the valve assemblies of the sample taker. In order to make possible the provision of the siphon pipes 31 and 31' in the sample taker adjacent each other, the chamber for the upper valve assembly is angularly spaced relative to the chamber for the lower valve assembly 106⁰, so that the siphon pipes 31 and 31', as well as the by-pass tube 14, pass through the outer tube 1 in a slightly diagonal manner. The said siphon head 31", which carries the upper siphon pipe 31, is provided with a very small upwardly tapered hole or flow bean 31⁰. This flow bean functions to enable gas to flow from the sample taker chamber upwardly into the tester string. Were it not for the flow bean 31⁰, such gas might otherwise accumulate in the liquid sample chamber and act as a separator, in cases of low test pressures, to promote gas-oil separation. With regard to the embodiment of FIG. 11, it may be noted that partially de-gasified oil remaining as a consequence of gas separation in the sample taker chamber is also eliminated and replaced by gas saturated oil at layer conditions during the after flow period through a small flow bean 43⁰ in mandrel 43" in the manner described above. The lower siphon head 31⁰⁰ has no hole formed therein.

A sieve plate 32, having upwardly directed conical bores 32' formed therein, is positioned in a recess of sleeve 9' by means of spring ring 32". The sieve plate 32 functions to prevent the penetration of coarse contamination particles, as for example, cuttings from the drilling mud, from entering the sample taker.

Each of the upper and lower valve chambers 2 and 2' contain discharge valve assemblies. One of such discharge valve assemblies is shown in transverse section in FIG. 3 and comprises a valve spindle 33, valve shaft 33', ball bearings 33", sleeves 33⁰, packing O-rings 33⁰⁰, and plug 33ˣ, with an axial bore 33ˣˣ connecting the valve to the interior of the sample taker chamber. The discharge valve assemblies function to permit the pumping of the content of the sample taker either into high pressure conveyance containers, or directly into a high pressure autoclave. For this purpose, the plugs 33ˣ may be conveniently removed and suitable connecting pipes attached to a pump (not shown) and to a conveyance container or autoclave to form a high pressure circuit for the exchage of a neutral fluid contained originally in the conveyance container or autoclave, with the liquid sample in the sample taker chamber.

If the formation test indicates the presence of oil, the latter with the original quantity of gas in solution therein, will be hermetically sealed in the sample taker chamber. Due to a temperature drop in the pulling of the sample taker from the depth of the bore hole to the surface, a pressure drop, and as a consequence gas liberation from the oil, will take place inside the sample taker. In order to again homogenize the liquid sample inside the sample taker, that is to again dissolve the gas which has escaped from the oil back in the oil, the temperature can be raised to bore hole temperature by a suitable heating bath and by shaking or swinging of the sample taker, so that the gas and oil contained therein are once again admixed in substantially the same manner that they were in the formation layer. Only after the liquid sample within the sample taker chamber has been restored as nearly as possible to the original condition thereof in the manner discussed above, are the valves 33 opened and the liquid samples pumped from the sample taker chamber under pressure to the high pressure conveyance or autoclave, as described above.

Another manner of transferring the contents of the sample taker chamber therefrom resides in the arrangement, by which the interior pressure in the sample taker chamber is built up by feeding a highly pressurized neutral liquid, as for example salt water, at surface temperature, into the sample taker chamber at a pressure sufficiently above the saturation pressure of the gas-oil mixture present therein. The gas-oil mixture is homogenized by shaking or swinging the sample taker, so that the gas thus returns to solution in the oil, whereupon the liquid content of the sample taker is pumped into the conveyance container or laboratory autoclave by a sufficiently high pressure to avoid escape of the gas from the solution with the oil. This latter method does not include any control of the temperature within the sample taker chamber. Once the liquid sample is suitably transferred, in any of the manners described above, to a laboratory autoclave, it is then investigated in accordance with well known methods.

In the operation of the sample taker it is assembled as seen in FIGS. 1 and 2 with the releasing rod 7 penetrating below the split ring 8', as shown. By-pass valve 4, to which the releasing rod 7 is attached, would normally be in the open position thereof during the running of the formation testing device into the bore hole. In cases wherein the sample taker is built into the formation tester string below the closed-in pressure valve in the manner illustrated by FIG. 11, or below the closed-in pressure and circulation tool, as described in the article "Formation Testing Fundamentals," referred to hereinabove, the releasing rod 7' with the ball-shaped enlarged lower end is located from the beginning in the lower position thereof, as shown in FIG. 11. In this case, normal flow through the sample taker takes place during the running of the formation testing device into the bore hole, because the tester valve located below the sample taker is run into the bore hole in the closed position of the tester valve.

Prior to the lowering of the sample taker into the bore hole, the upper and lower valve assemblies, which include valve bodies 18 and 18', are opened and armed with the use of the arming fork, as described hereinabove. After having lowered the formation testing device to the depth at which the test is desired, the packer or packers are set in the manner described in the article referred to hereinabove, and the by-pass valve is closed by lowering piston 4 into valve chamber 5. Thus, if the sample taker is disposed below the by-pass valve in the manner shown in FIG. 1, the releasing rod 7 fastened to the lower end of the piston 4 moves further downwards below the split spring clip ring of the coupling member and stays in the lowermost position thereof until the completion of the formation testing operation.

During the performance of the flow test fluid originating from the formation tested passes from the lower part of the tester string to the sample taker, penetrating thereinto at the lower end thereof through the sieve plate 32 and the lower valve assembly. At this point, the fluid is prevented, by guide glands 13″ and 13⁰⁰⁰ from taking the path through the by-pass tube 14, and also by the closure of holes 29 and 29′ by the piston sleeves 27 and 27′, respectively. The fluid flows from the lower valve assembly upwardly through the lower siphon pipe 31′, then downwardly through the sample taker chamber in displacing the drilling mud from the chamber, and then upwardly through siphon pipe 31 to pass through the upper valve assembly into space 6 and therefrom through 6′, as seen in FIG. 1. Alternatively, in the construction depicted in FIG. 11, the fluid would flow from the upper valve assembly through the annular space between the mandrel 43″ and sub 50, and therefrom through hole 43⁰ into the upper portion of the formation testing string and into the drill pipe, as described in the literature referred to hereinabove.

At the completion of the flow test, the closed-in pressure valve located above the sample taker in FIG. 11 is partially closed by rotating the drill pipe a sufficient number of revolutions to raise mandrel 43″ to in turn bring the level of the hole 43⁰ up to the level of packing 47, to leave only the small flow bean 43⁰⁰ open. The very small flow rate through the flow bean 43⁰⁰ will then cause the fluid pressure within the sample taker to increase to a level very close to the formation pressure. Thus, gas which may have come out of solution with the oil sample, which was highly saturated with gas at original formation conditions, may then be eliminated from the tester string portion below the small flow bean 43⁰⁰ and flow therefrom into the upper portion of the formation tester string and into the drill pipe. As a result thereof, gas saturated oil, very close to original formation conditions, may replace the gas thus liberated from the sample taker. Further rotation of the drill pipe of predetermined extent will then function to raise the small flow bean 43⁰⁰ into the packing 47 to thus close the closed-in pressure valve completely, whereupon the pressure in the sample taker will assume essentially original formation pressure. Further rotation of the drill pipe will eventually operate the closing mechanisms of the sample taker valves by raising the releasing rod 7 in the manner described hereinabove. If the sample taker is located below the by-pass valve in the manner illustrated in FIG. 1, the formation tester string is partly lifted by the draw work in the derrick, as described above, to move the piston 4 of the by-pass valve upwardly relative to the by-pass valve case 5. The rod 7 which is attached to the lower end of piston 4, by being connected over the sample taker to the lower portion of the tester string which includes the packer, and is thus held in its lower position by the hydrostatic head of the drilling mud on the packer. At the commencement of the relative upward movement of the piston 4, and before the by-pass valve is opened, the releasing rod 7 which is attached to the lower end of piston 4, engages the split ring 8′ to which the coupling 8, and the left arm of the double-armed lever 9″ are attached through the medium of screw 8″ connected therebetween. The upward movement of the left arm of the lever 9″ results in corresponding downward movement of the right arm of the said lever 9″ to result in downward movement of the tappet 10, which is attached thereto. The lower end of the tappet engages the right arm of the bell crank 11, with the left arm of the said bell crank being urged against coil spring 35, and the generally vertical arm of the bell crank being urged in the clockwise direction about the bell crank pivot pin 34⁰ to in turn release portion 12″ of the valve stem 12 from abutment with the generally vertical arm of the bell crank 11. As the valve stem 12 is released from engagement with the said bell crank arm, coil spring 17 forces the valve body 18 into the closed position thereof inside the recess in the valve case 30 with ground seat surfaces 32 and 23 contacting each other. The coil spring 17 also forces the piston sleeve 27 upwardly so that slots 28 and holes 29 register to provide a portion of flow path through the sample taker through bypass tube 14 in the manner described above. As the valve body 18 and valve stem 12 assume the closed positions thereof, the catching dogs 24 are urged into engagement with the grooves 26 provided in the valve stem 12, whereupon the valve body is securely maintained in its closed position notwithstanding any pressure differential which may act thereon.

Simultaneously with the closing of the upper valve assembly, the pull rod 13 is pulled upwardly by the coupling 8 and screw 8″ to move the left arm of the lever 15 upwardly to a corresponding extent about pivot pin 9⁰. Tappet 16 is thus moved upwardly to in turn move bell crank 11′ in the clockwise direction to free the valve stem 12′ from abutment with the generally vertical arm of the said bell crank, whereupon the lower valve body 18′ will be moved into the closed position thereof in substantially the same manner as is the upper valve body 18. Thus, slots 28′ will now be in register with holes 29′, whereby fluid may pass from one end of the sample taker to the other through the by-pass tube 14 and the respective slots and holes 28, 29 and 28′, 29′, without effect on the hermetically sealed content of the sample taker chamber. In cases, wherein the sample taker is located below the closed-in pressure and circulating valve or tube, as shown in FIG. 11, the closing mechanism of the sample taker valve is activated by the third period of rotation of the drill pipe, as discussed above, with the lower, enlarged ball-shaped end of the releasing rod 7′ functioning at this point to engage the split spring clip ring 8′ to move coupling 8 and screw 8″ upwardly, whereupon the upper and lower sample taker valves are closed in the same manner described in conjunction with FIGS. 1 and 2.

In cases wherein the sample taker is located below the closed-in pressure and circulating valve or tool of the formation tester, in the manner seen in FIG. 11, and above the formation device tester valve, the pressure in the space outside of the sample taker valve, but within the sample taker, remains unchanged after the valve has been closed, since the hydrostatic mud pressure has no access to this portion of the tester string. The sample taker valve thus remains closed with practically no pressure differential acting thereon, since the pressure both within the sample chamber and without the sample chamber is substantially identical. Thus, it is only when the pressure from the space between the sample taker is released, that the sample taker valve has to be maintained in the closed position thereof against any significant pressure differential.

While I have disclosed one embodiment of the present invention, it is to be understood that this embodiment is given by example only and not in a limiting sense, the scope of the present invention being determined by the objects and the claims.

I claim:

1. A sample taker for liquids from layers found in deep drilling comprising tubing adapted to be inserted in a drilling hole, an outer tube adapted to be inserted into said tubing of a formation testing device below a main valve provided therein, a plug valve secured to each end of said outer tube, and means for closing said plug valves responsive to a movement of said tubing, a pressure equalization valve having a valve piston and being disposed axially adjacent said sample taker, said pressure equalization valve being opened by said movement of said tubing, said closing means comprising a releasing rod secured to the lower end of and movable with said pressure equalization valve, a valve rod axially movable in each of said plug valves, a spring coupling operatively connecting said releasing rod with one of said plug valves, a first double-armed lever disposed in each of said plug valves, a tappet disposed axially in each of said plug valves and one end of said tappets engaging one arm of the corresponding of said first double-armed levers and moving axially said tappets, the other arm of one of said first double-armed levers being cooperatively associated with said releasing rod and movable therewith in at least one direction, a second double-armed lever disposed in each of said plug valves, one arm of each of said double-armed levers engaging the other end of the corresponding of said tappets, the other arm of said second double-armed levers engaging one end of the corresponding of said valve rods and retain the latter in their open position, a hollow valve body for each of said plug valves, a helical spring disposed in each of said valve bodies and urging said plug valves into their closed position, so that upon release of said valve rods by said second arm of said second double-armed lever said plug valves are closed.

2. The sample taker, as set forth in claim 1, which includes a valve packing for each of said plug valves, and protecting rings covering partly said valve packings, in order to protect the latter against damages during the flow of liquid through said sample taker.

3. The sample taker, as set forth in claim 1, wherein said valve rods have annular grooves over a part of their axial length, a stopper cap disposed in each of said valve bodies opposite said annular grooves, a second spring disposed in each of said valve bodies and urging said stopper caps into said grooves and retaining said valves in their closed position, such that an increased outer pressure relative to the inner pressure of said sample taker cannot open said plug valves.

4. The sample taker, as set forth in claim 3, which includes syphon tubes disposed axially below the upper of said plug valves and above the lower of said plug valves, said syphon tubes displacing the liquid originally present in said sample taker and feeding fluid originating in the layers into said sample taker.

5. The sample taker, as set forth in claim 4, which includes an annular piston having radial slot in each of said valve bodies, said annular pistons being secured to the corresponding of said valve rods, each of said valve bodies having radial bores aligned with said radial slots in the closed position of said plug valves and axially displaced relative to each other in the open position of said plug valves, so that the passage of the liquid through said radial slots and said radial bores is prevented and the entire flow of the fluid originating from the deposit is forced through said sample taker.

6. The sample taker, as set forth in claim 5, which includes a connecting pipe extending axially through said outer tube and sealed at both ends relative to the chambers of said plug valves, and wherein said connecting pipe permits the passage of fluid from one end of said sample taker to its other end and which includes a connecting rod for connecting said closing means of one of said plug valves with those of the other of said plug valves.

7. The sample taker, as set forth in claim 6, which includes a discharge valve in each of said valve bodies permitting the discharge of the content of said sample taker under pressure.

8. In a sample taker for recovering fluids under original conditions from layers found in deep well drillings, a string of tubing adapted to be positioned in a drilling hole, an outer tube adapted to be disposed in superposed positions in said string of tubing, outwardly closing plug valve means positioned at each end of said outer tube for closing the said ends to enclose fluid within said outer tube in a pressure-tight manner, passage means through said outer tube and said valve means for flushing and filling said outer tube with fluid at original layer conditions, while said plug valve means are open, and means disposed between said tubing and said valve plug means for closing said plug valve means in response to a movement of said tubing string.

9. The sample taker, as set forth in claim 8, wherein said closing means are responsive to a vertical movement of said tubing string.

10. The sample taker, as set forth in claim 8, wherein said closing means are responsive to a rotary movement of said tubing string.

11. In a sample taker for recovering fluids from layers found in deep well drillings.

an outer tube, means forming a sample fluid chamber in said outer tube for the flow of fluids therethrough, means forming a by-pass passage in said outer tube for the flow of fluids therethrough independent of said sample fluid chamber, valve means cooperatively associated with said means forming said sample fluid chamber and said means forming said by-pass passage, respectively, said valve means being movable from first positions thereof relative to said means forming said sample fluid chamber and said means forming said by-pass passage, respectively, to second positions thereof relative thereto, said valve means being operable, in said first positions thereof, to permit fluid flow through said sample liquid chamber while preventing fluid flow through said by-pass passage and, in said second positions thereof, to seal said sample fluid chamber to prevent fluid flow therethrough while permitting fluid flow through said by-pass passage, and means to move said valve means from said first position thereof to said second position thereof.

12. The sample taker, as set forth in claim 11, wherein said means to move said valve means from said first position thereof to said second position thereof comprise, means biasing said valve means to said second positions thereof, releasable means maintaining said valve means in said first positions thereof against the action of said biasing means, and means for releasing said releasable means to enable said biasing means to move said valve means to the second positions thereof.

13. The sample taker, as set forth in claim 11, wherein said valve means comprise valve bodies and valve seats which are operable to seal said sample fluid chamber when said valve means are in said second position thereof, and first and second, relatively movable wall portions which are in surface contact and include passage means formed therein, said passgae means being in fluid flow alignment with each other and in fluid flow communication with said by-pass passage when said valve means are in said second position thereof.

14. The sample taker, as set forth in claim 11, wherein said means to move said valve means from said first position thereof to said second position thereof comprise, means biasing said valve means to said second positions thereof, releasable means maintaining said valve means in said first positions thereof against the action of said biasing means, means for releasing said releasable means to enable said biasing means to move said valve means to the said second position thereof, and said valve means comprise, valve bodies and valve seats which are operable to seal said sample fluid chamber when said valve means are in said second position thereof, and first and second, relatively movable wall portions which are in surface contact and include passage means formed therein, said passage means being in fluid flow alignment with each other and in fluid flow communication with said by-pass passage when said valve means are in said second position thereof.

References Cited by the Examiner
UNITED STATES PATENTS

| | | | |
|---|---|---|---|
| 2,073,107 | 3/37 | Johnston | 166—145 |
| 2,099,080 | 11/37 | Rusler | 166—3 |
| 2,103,940 | 12/37 | Fletcher | 166—150 |
| 2,337,752 | 12/43 | Johnston | 166—150 |
| 2,719,588 | 10/55 | Huber | 166—224 |

BENJAMIN HERSH, *Primary Examiner.*